Figure 1:
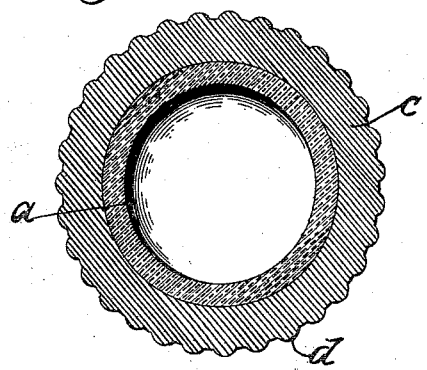

G. L. HARVEY.
PLAY BALL.
APPLICATION FILED NOV. 4, 1902. RENEWED AUG. 18, 1909.

985,741.

Patented Feb. 28, 1911.

Witnesses:
W. N. Leach
A. D. Russell

Inventor:
George L. Harvey,
By George L. Cragg
Attorney

THE NORRIS PETERS CO., WASHINGTON, D. C.

UNITED STATES PATENT OFFICE.

GEORGE LYON HARVEY, OF CHICAGO, ILLINOIS, ASSIGNOR OF ONE-HALF TO FRANCIS H. RICHARDS, OF HARTFORD, CONNECTICUT, AND ONE-SIXTH TO GEORGE L. CRAGG AND ONE-SIXTH TO OSCAR J. FRIEDMAN, OF CHICAGO, ILLINOIS.

PLAY-BALL.

985,741.          Specification of Letters Patent.      Patented Feb. 28, 1911.

Application filed November 4, 1902, Serial No. 130,042. Renewed August 18, 1909. Serial No. 513,503.

*To all whom it may concern:*

Be it known that I, GEORGE L. HARVEY, citizen of the United States, residing at Chicago, in the county of Cook and State of Illinois, have invented a certain new and useful Improvement in Play-Balls, of which the following is a full, clear, concise, and exact description, reference being had to the accompanying drawings, forming a part of this specification.

My invention relates to play balls and is of particular utility in the formation of golf balls. A great desideratum in the construction of golf balls is a structure whereby a light, strong and very resilient ball is secured.

The material that I have discovered to be most effective in the construction of the ball core is glass or vitreous material, and the core is preferably formed by blowing the glass into a hollow sphere, by which method no solid central core as a foundation for the shell need be employed, whereby the weight of the ball is decreased, though the resiliency of the ball is greatly increased.

In the preferred manufacture of the ball of my invention I inclose the glass shell by a gutta-percha, or equivalent envelop, provided with the usual hobs, desirably in the form of small hemispherical projections. This envelop is preferably of such a thickness that a club when improperly applied to the ball will not cut through to the glass, there being thus always preferably provided the substance of the envelop upon which to strike the club, the glass being at all times concealed. Where it is desired to make the ball extremely light, a glass shell may be selected, which in itself would fracture when struck by a club or against a resisting body, but which when forming a component part of the product of my invention is adapted to withstand the blows that are given to it in golf play. I believe I am the first to devise a play ball having for its core a hollow glass ball and provided with a striking surface formed by an envelop surrounding the ball. The product of the invention is most useful, in that the thickness of the glass ball is not depended upon.

The inherent strength of the entire product is secured by the novel association of the central shell of my selection with a coating adapted to properly protect the same and which as stated provides, with the central shell, a product having all the desired characteristics of the play ball with objections that may be found in the component parts of the ball eliminated.

Where it is desired to apply my invention to the Haskell type of ball, the envelop is composite in structure, the outer section of the envelop being the same as the envelop before described, while there is provided an inner section of the envelop formed of rubber strands or bands wrapped around the glass ball and incased by the outer section of the envelop. This composite envelop is desirably a trifle thicker than the envelop of a single layer, so that the rubber bands may not, in the ordinary use to which the ball is subject, be exposed. In other words, the preferred embodiment of my invention comprises a play ball having a hollow glass shell and a composite envelop inclosing the shell and formed of an outer solid spherical layer and an inner spherical layer formed of rubber bands wrapped about the glass shell.

I will explain my invention more fully by reference to the accompanying drawing, in which—

Figure 2:
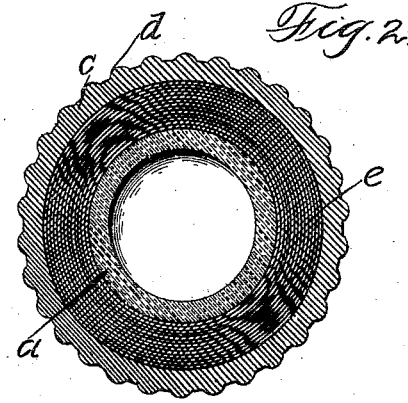
Figure 3:
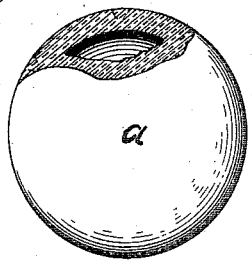

Figure 1 illustrates in section one type of ball constructed in accordance with my invention; Fig. 2 illustrates the Haskell type of ball to which my invention has been applied. Fig. 3 is a view of the central shell illustrated in Fig. 1 partially in elevation and partially in section.

Like parts are indicated by similar characters of reference throughout the different figures.

In the preferred embodiment of the invention illustrated in the drawing, the ball has as a nucleus a glass shell *a* that is blown into the desired shape, and which is hollow, the glass being more highly resilient than any other material I have been able to discover for imparting the desired resiliency to the ball. This nucleus of highly resilient material is very easily formed into one integral mass by being blown. The glass shell may be very perfectly formed into a spherical shape by skilful glass blowers, and, if desired, a mold may be employed to insure uniform size and spherical shape.

A surface is provided about the glass shell which will enable the metal striking element to have stable engagement with the play ball, to which end I preferably inclose the shell in an envelop $c$ of gutta-percha, vulcanized rubber or other material of like character, desirably provided with hobs $d$. The envelop surrounding the glass shell may be of composite nature if desired, there being indicated in Fig. 2 an envelop formed of the outer section $c$ and an inner section $e$, the outer section $c$ being preferably the same as the corresponding portion of the structure illustrated in Fig. 1, while the inner section $e$ is desirably formed of rubber bands wrapped about the resilient shell.

In the form of the invention illustrated in Fig. 1 the glass shell may be one and one-fourth inches in outer diameter and one-eighth of an inch thick, while the inclosing envelop may have a diameter of one and three-fourths inches over all. In the form of invention illustrated in Fig. 2 the glass shell may have an outer diameter of one inch, while it may be one-eighth of an inch in thickness. The envelop may have an outer diameter over all of one and three-fourth inches, while the layer $e$ may have a thickness of one-fourth of an inch.

Having thus described my invention, I claim as new and desire to secure by Letters Patent:

1. As a new article of manufacture, a play ball comprising a hollow glass shell and a composite envelop inclosing the shell and formed of an outer solid spherical layer and an inner spherical layer formed of rubber bands wrapped about the glass shell, substantially as described.

2. As a new article of manufacture, a play ball comprising a glass shell and a composite envelop inclosing the shell and formed of an outer solid layer and an inner layer formed of rubber bands wrapped about the glass shell, substantially as described.

3. As a new article of manufacture, a play ball comprising a hollow glass shell and an envelop to be struck surrounding said shell, substantially as described.

In witness whereof, I hereunto subscribe my name this 31st day of October A. D., 1902.

GEORGE LYON HARVEY.

Witnesses:
GEORGE L. CRAGG,
A. D. RUSSELL.

---

Copies of this patent may be obtained for five cents each, by addressing the "Commissioner of Patents, Washington, D. C."